(12) United States Patent
Yoshihara et al.

(10) Patent No.: US 7,433,312 B2
(45) Date of Patent: Oct. 7, 2008

(54) DYNAMIC BAND ALLOCATION CIRCUIT, DYNAMIC BAND ALLOCATION METHOD, DYNAMIC BAND ALLOCATION PROGRAM, AND RECORDING MEDIUM

(75) Inventors: Osamu Yoshihara, Urayasu (JP); Noriyuki Oota, Chiba (JP); Noriki Miki, Yokohama (JP)

(73) Assignee: Nippon Telegraph & Telephone Corporation of Japan, Tokyo (JP)

( * ) Notice: Subject to any disclaimer, the term of this patent is extended or adjusted under 35 U.S.C. 154(b) by 389 days.

(21) Appl. No.: 10/544,681

(22) PCT Filed: Dec. 21, 2004

(86) PCT No.: PCT/JP2004/019073

§ 371 (c)(1),
(2), (4) Date: Aug. 4, 2005

(87) PCT Pub. No.: WO2005/062543

PCT Pub. Date: Jul. 7, 2005

(65) Prior Publication Data

US 2006/0176806 A1  Aug. 10, 2006

(30) Foreign Application Priority Data

Dec. 24, 2003  (JP) ............................. 2003-428349

(51) Int. Cl.
*G01R 31/08* (2006.01)
*H04J 3/16* (2006.01)
(52) U.S. Cl. ....................................... 370/235; 370/468
(58) Field of Classification Search ................ 370/468, 370/231–234, 230.1, 229, 235, 236, 395.21, 370/395.2, 395.41
See application file for complete search history.

(56) References Cited

U.S. PATENT DOCUMENTS 5,463,620 A * 10/1995 Sriram ........................ 370/412

(Continued)

FOREIGN PATENT DOCUMENTS

JP  936880  2/1997

(Continued)

OTHER PUBLICATIONS

Osamu Yoshihara, Noriyuki Oota, Toshiki Miki, "GE-PON ni Tekishita Doteki Taiiki Wariate Algorithm", The Institute of Electronics, Information and Communication Engineers Gijutu Kenkyu Hokoku, NS2002-17-25, The Institute of Electronics, Information and Communication Engineers, Apr. 12, 2002, vol. 102, No. 20, pp. 1-4 (with English abstract).

(Continued)

*Primary Examiner*—Kwang B. Yao
*Assistant Examiner*—Candal Elpenord
(74) *Attorney, Agent, or Firm*—Harness, Dickey & Pierce, PLC

(57) ABSTRACT

In a P2MP system in which upstream bandwidth is shared by a plurality of ONUs, a dynamic bandwidth allocation circuit is provided which reduces the consumption of memory capacity, and avoids the divergence of parameters. A dynamic bandwidth allocation circuit provided in an optical line terminal (OLT) calculates, for each cycle and for each ONU, a target data size ($target_{j,k}$) which constitutes a target for allocated data size ($allocated_{j,k}$). Furthermore, taking the time constant of an exponential weighted moving average as $\tau$, and taking $\alpha=(\tau-1)/(\tau+1)$, an ideal allocated data size ($ideal_{j,k}$) is calculated by $ideal_{j,k}=target_{j,k}-(\alpha/(1-\alpha))\cdot excess_{j,k-1}$. Furthermore, an excess allocated data size ($excess_{j,k}$) per one cycle is calculated by $excess_{j,k}=\alpha\cdot excess_{j,k-1}+(1-\alpha)\cdot(allocated_{j,k}-target_{j,k})$. If $ideal_{j,k}<0$, the condition that bandwidth allocation is not granted is used for bandwidth allocation.

22 Claims, 7 Drawing Sheets

U.S. PATENT DOCUMENTS

| | | | |
|---|---|---|---|
| 5,878,029 A | 3/1999 | Hasegawa et al. | |
| 6,434,164 B1* | 8/2002 | Matsunaga et al. | 370/443 |
| 6,628,616 B2* | 9/2003 | Licht | 370/232 |
| 6,993,044 B2* | 1/2006 | McKinnon et al. | 370/468 |
| 7,065,045 B2* | 6/2006 | Jeffries et al. | 370/230 |
| 7,209,443 B2* | 4/2007 | Mukai et al. | 370/235 |
| 2001/0028633 A1* | 10/2001 | Shimada et al. | 370/252 |
| 2002/0085492 A1* | 7/2002 | Mukai et al. | 370/230 |
| 2003/0048805 A1* | 3/2003 | Yoshihara et al. | 370/468 |

FOREIGN PATENT DOCUMENTS

| | | |
|---|---|---|
| JP | 2002-237825 A | 8/2002 |
| JP | 2003-087281 A | 3/2003 |
| JP | 2003-087282 A | 3/2003 |
| JP | 2003-087283 A | 3/2003 |

OTHER PUBLICATIONS

Tadatsugu Komatsu, Kenji Kawahara, Yuji Oie, "Traffic no Choki Izonsei o Koryo shita Passive Keisoku Shuho no Kaizen to Sono Koka", Information Processing Society of Japan Kenkyu Hokoku, 2003-QAI-6, Information Processing Society of Japan, Feb. 6, 2003, Feb. 7, 2003, vol. 2003, No. 12, pp. 19-24 (with English Abstract).

Osamu Yoshihara et al., "Dynamic Bandwidth Alocation Algorithm for GE-PON Realizing Low Latency and High Efficiency" with materials for an OHP presentation, Technical Report of IEICE, The Institute of Electronics, Information and Communication Engineers, PNI Technical Group, Osaka University, Oct. 23, 2002 (with English abstract).

* cited by examiner

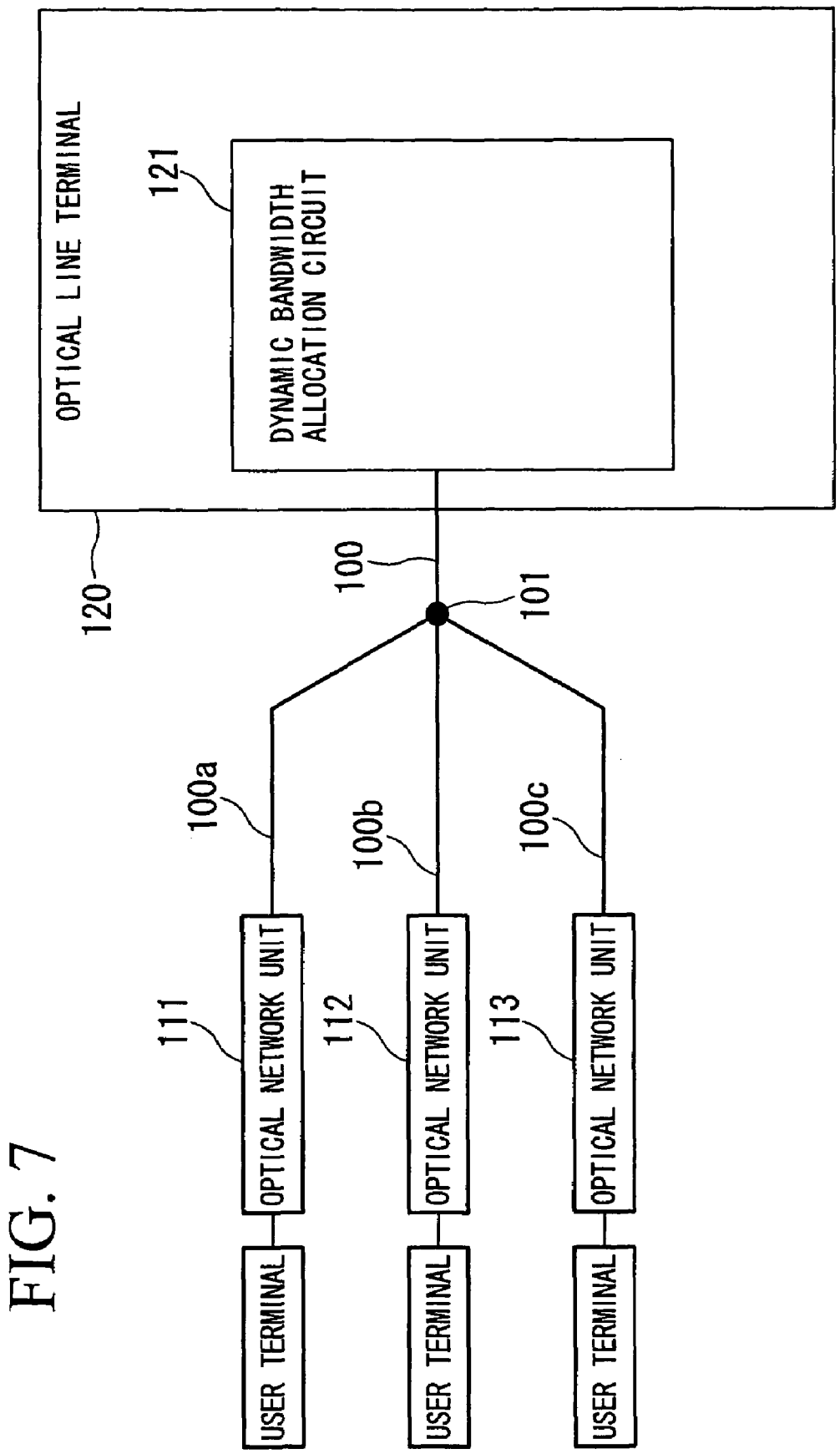

DYNAMIC BAND ALLOCATION CIRCUIT, DYNAMIC BAND ALLOCATION METHOD, DYNAMIC BAND ALLOCATION PROGRAM, AND RECORDING MEDIUM

TECHNICAL FIELD

The present invention relates to a dynamic bandwidth allocation circuit, a dynamic bandwidth allocation method, a dynamic bandwidth allocation program, and a recording medium, with which, in a network system in which a plurality of optical network units and a single optical line terminal are connected in a P2MP (Point to MultiPoint) topology, transmission bandwidths from the optical network units to the optical line terminal are dynamically allocated according to the contracted bandwidth of the sources of requests.

Priority is claimed on Japanese Patent Application No. 2003-428349 filed on Dec. 24, 2003, the content of which is incorporated herein by reference.

BACKGROUND ART

When sharing a transmission bandwidth from an optical network unit (ONU) to an optical line terminal (OLT) for a plurality of ONUs or service paths, as a scheme for dynamically allocating bandwidths according to the bandwidth contracted by each request source, a scheme is proposed in which a bandwidth allocation is determined, based upon information related to the cumulative value of bandwidth allocation sizes which have been allocated in the past.

The topology of such a conventional scheme is shown in FIG. 7. An optical fiber 100 which is connected to a single optical line terminal (OLT) 120 is branched by an optical branching section 101 into a plurality of fibers 100a, 100b, and 100c, and these are connected to an optical network unit (ONU) 111, 112, and 113, respectively.

Each of the ONUs 111, 112, and 113 notifies a request data size to the OLT 120. On each cycle and for each of the ONUs, for example, a dynamic bandwidth allocation circuit 121 which is provided inside the OLT 120 calculates a target data size by apportioning the ideal total allocated bandwidth proportionally according to the contracted bandwidth; calculates the excess allocated data size from the cumulative value of the difference between the allocated data size of each cycle up to the previous cycle and the target data size; and determines the bandwidth allocation for the next cycle based upon the excess allocated data size and the request data size (for example, refer to Patent Document 1).

Patent Document 1: Japanese Unexamined Patent Application, First Publication No. 2003-087283

DISCLOSURE OF INVENTION

Problem to be Solved by the Invention

In the example of conventional technique described above, if the request data size is smaller than the target data size, and the actual transmitted data size has continued to be less than the target data size, then the excess allocated data size continues to diminish with every cycle, and may diverge negatively. It has been contemplated to set a lower limit value in order to prevent such divergence. However, in this case as well, fair distribution of the bandwidths between the ONUs for which the excess allocated data size has arrived at the lower limit value becomes difficult.

In order to prevent divergence, there is also a method in which the excess allocated data size is calculated from the moving average value of the difference between the allocated data size and the target data size in a fixed period. Although, in this case, it is possible to avoid divergence of the excess allocated data size, it is necessary to store the differences between the allocated data size and the target data size for all of the cycles in the fixed period, so that a large memory capacity becomes necessary.

The present invention is made in the light of the above-described problems, and an object of the present invention is to provide, in a P2MP system in which upstream bandwidth is shared by a plurality of ONUs, a dynamic bandwidth allocation circuit, a dynamic bandwidth allocation method, a dynamic bandwidth allocation program, and a recording medium, with which it is possible, along with reducing the amount of consumption of memory capacity and suppressing the divergence of parameters, also to implement various bandwidth limitation setting functions.

Means for Solving the Problem

The present invention has been conceived in order to solve the above-described problem; and the dynamic bandwidth allocation circuit according to the present invention is provided in a single optical line terminal of a P2MP system in which a plurality of optical network units and the single optical line terminal are connected, and which shares bandwidth in an upstream direction between the plurality of optical network units, comprising: a target data size calculation section which, upon each cycle and for each of the optical network units, calculates target data sizes (target$_{j,k}$) which are targets for allocated data sizes in one cycle (allocated$_{j,k}$, where j is a number of an optical network unit and k is a cycle); an ideal allocated data size calculation section which calculates ideal allocated data sizes (ideal$_{j,k}$) according to ideal$_{j,k}$=target$_{j,k}$−($\alpha$/(1−$\alpha$))·excess$_{j,k-1}$, where $\tau$ is an exponential weighted moving average time constant, and $\alpha$=($\tau$−1)/($\tau$+1); an excess allocated data size calculation section which calculates excess allocated data sizes (excess$_{j,k}$) for one cycle according to excess$_{j,k}$=$\alpha$·excess$_{j,k-1}$+(1−$\alpha$)·(allocated$_{j,k}$−target$_{j,k}$); and a bandwidth allocation calculation section which does not grant bandwidth allocation, if the ideal$_{j,k}$<0.

With such a structure, there is no very great consumption of memory capacity, and the values of the parameters are not caused to diverge, so that it becomes possible to apportion the allocated data size according to the contracted capacity. In other words, with the above-described conventional technique, there is the method of setting a lower limit value in order to prevent divergence. In this case, however, fair distribution of bandwidth between the ONUs for which the excess allocated data size has arrived at the lower limit value is difficult. In contrast, with the present invention, this type of problem does not occur. Furthermore, with the conventional technique, in order to prevent divergence, there is the method of calculating the excess allocated data size according to the moving average value of the difference between the allocated data size and the target data size over a fixed time period, in this case. In this case, although it is possible to avoid the excess allocated data size diverging, it is necessary to store the differences between the allocated data size and the target data size for all of the cycles within the fixed time period, so that a large memory capacity is required. In contrast, with the present invention, it is possible to avoid this problem.

Furthermore, with the dynamic bandwidth allocation circuit according to the present invention, the ideal allocated data size calculation section may calculate the ideal allocated data sizes (ideal$_{j,k}$) according to ideal$_{j,k}$=target$_{j,k}$−excess$_{j,k-1}$, and the excess allocated data size calculation section may calculate the excess allocated data sizes (excess$_{j,k}$) according to excess$_{j,k}$=α·(allocated$_{j,k}$−ideal$_{j,k}$).

With such a structure, there is no great consumption of memory capacity, and there is no divergence of the values of parameters, so that, along with it becoming possible to apportion the allocated data size according to the contracted capacity, it is also possible to alleviate the load of calculation processing.

Furthermore, with the dynamic bandwidth allocation circuit according to the present invention, the dynamic bandwidth allocation circuit may comprise: a bandwidth request reception section which receives request data sizes corresponding to the plurality of optical network units; a maximum target data size calculation section which calculates maximum target data sizes corresponding to the target data sizes in proportion to maximum limit bandwidths; a guaranteed target data size calculation section which calculates guaranteed target data sizes in proportion to minimum guaranteed bandwidths; a time constant setting section which sets a time constant for maximum bandwidth and a time constant for guaranteed bandwidth as the exponential weighted moving average time constant; a maximum bandwidth excess allocated data size calculation section and a guaranteed bandwidth excess allocated data size calculation section which correspond to the excess allocated data size calculation section; and a maximum bandwidth ideal allocated data size calculation section and a guaranteed bandwidth ideal allocated data size calculation section which correspond to the ideal allocated data size calculation section, and wherein the bandwidth allocation calculation section: may determine a condition not to grant bandwidth allocation if ideal allocated data sizes for maximum bandwidth (max_ideal$_{j,k}$) satisfies max_ideal$_{j,k}$<0; may construct an allocation order list by sorting numbers of the optical network units in order of smallness of values obtained by dividing excess allocated data sizes for guaranteed bandwidth for the respective optical network units by guaranteed bandwidths; and may allocate the request data sizes from the head of the allocation order list which has been calculated in a previous cycle, for the optical network units for which bandwidth allocation has been granted by the condition, while taking a preset upper limit value for total data size which can be allocated in one cycle as an upper limit.

With such a structure, it is possible to set a parameter for guaranteed bandwidth and a parameter for maximum bandwidth, and thus it is possible to perform various different types of maximum bandwidth limitation and minimum bandwidth guarantee.

Furthermore, with the dynamic bandwidth allocation circuit according to the present invention, the guaranteed target data size calculation section may obtain the guaranteed target data sizes by proportionally apportioning a data area which can be allocated in one cycle between the optical network units for which bandwidth requests have occurred in the present cycle, in proportion to the minimum guaranteed bandwidths; takes the guaranteed target data sizes of the optical network units which exceed the maximum limit bandwidths as being limited by the maximum target data sizes, and reapportions differences between the guaranteed target data sizes and the maximum target data sizes in proportion to the minimum guaranteed bandwidths between the optical network units which have not yet reached maximum; and repeats reapportionment until the guaranteed target data sizes of all of the optical network units become less than or equal to the maximum target data sizes.

With such a structure, it is possible to perform maximum bandwidth limitation and minimum bandwidth guarantee.

Furthermore, with the dynamic bandwidth allocation circuit according to the present invention, there may be comprised: a section which sets each of the time constant for maximum bandwidth and the time constant for guaranteed bandwidth to independent and arbitrary values; and a section which sets the value of the time constant for maximum bandwidth so that it becomes greater than the value of the time constant for guaranteed bandwidth.

With such a structure, it is possible to implement an appropriate bandwidth limitation function, according to the state of bandwidth congestion.

Furthermore, with the dynamic bandwidth allocation circuit according to the present invention, there may be comprised: a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth (max_ideal$_{j,k}$) satisfies max_ideal$_{j,k}$<0; a section which turns the maximum bandwidth limitation function ON and OFF dynamically; and a section which turns the maximum bandwidth limitation function OFF for all subordinate optical network units, if no signal is received from a host network indicating a transition from no congestion being present to congestion being present; turns the maximum bandwidth limitation function ON for all the optical network units, if a signal has been received indicating the occurrence of congestion, and again turns the maximum bandwidth limitation function OFF, after a fixed time period has elapsed.

With such a structure, it becomes possible to turn the maximum bandwidth limitation function ON during a fixed time period after the receipt of a signal showing the transition from no congestion being present to congestion being present, and it becomes possible to limit bandwidth only for heavy users who are continually taking up bandwidth.

Furthermore, with the dynamic bandwidth allocation circuit according to the present invention, there may be comprised: a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth (max_ideal$_{j,k}$) satisfies max_ideal$_{j,k}$<0; a section which turns the maximum bandwidth limitation function ON and OFF dynamically; and a section which turns the maximum bandwidth limitation function OFF for all subordinate optical network units, if no signal is received from a host network indicating a congested state, or if a signal is received from the host network indicating that the congested state has been cleared up, and which turns the maximum bandwidth limitation function ON for all the optical network units, if a signal has been received indicating the congested state.

With such a structure, it becomes possible to turn the maximum bandwidth limitation function ON only when a signal is received which indicates a congested state, and to turn the maximum bandwidth limitation function OFF while no signal which indicates a congested state is being received, or while a signal is being received which shows that the congested state has been cleared up; so that it becomes possible to limit bandwidth only for heavy users who are continually taking up bandwidth.

Furthermore, with the dynamic bandwidth allocation circuit according to the present invention, there may be comprised: a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth (max_ideal$_{j,k}$) satisfies max_ideal$_{j,k}$<0; a section which turns the maximum bandwidth limitation function ON and OFF dynamically; and a section which turns the maximum bandwidth limitation function ON, if it has been determined that a congested state is present from a size of upstream traffic which the optical line terminal has received, and which turns the maximum bandwidth limitation function OFF, if it has been determined that the congested state has been cleared up.

With such a structure, it becomes possible for the optical line terminal itself to determine upon the congested state, and to turn the maximum bandwidth limitation function ON and OFF, so that it becomes possible to limit bandwidth only for heavy users who are continually taking up bandwidth.

Furthermore, with the dynamic bandwidth allocation circuit according to the present invention, there may be comprised: a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth (max_ideal$_{j,k}$) satisfies max_ideal$_{j,k}$<0; a section which turns the maximum bandwidth limitation function ON and OFF dynamically; and a section which sets a maximum bandwidth limitation starting time instant and a maximum bandwidth limitation ending time instant for a timer which is provided in the optical line terminal, and which turns the maximum bandwidth limitation function ON when the starting time instant arrives, and turns the maximum bandwidth limitation function OFF when the ending time instant arrives.

With such a structure, it is possible to perform the ON and OFF control of the maximum bandwidth limitation function by setting the time period of the timer.

Furthermore, the dynamic bandwidth allocation method according to the present invention is one for a P2MP system in which a plurality of optical network units and a single optical line terminal are connected, and which shares bandwidth in an upstream direction between the plurality of optical network units, comprising: a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle); an ideal allocated data size calculation step which calculates ideal allocated data sizes (ideal$_{j,k}$) according to ideal$_{j,k}$=target$_{j,k}$−(α/(1−α))·excess$_{j,k-1}$, where τ is an exponential weighted moving average time constant, and α=(τ−1)/(τ+1); an excess allocated data size calculation step which calculates excess allocated data sizes (excess$_{j,k}$) for one cycle according to excess$_{j,k}$=α·excess$_{j,k-1}$+(1−α)·(allocated$_{j,k}$−target$_{j,k}$); and a bandwidth allocation calculation step which does not grant bandwidth allocation if ideal$_{j,k}$<0.

With such steps, there is no very great consumption of memory capacity, and the values of the parameters are not caused to diverge, so that it becomes possible to apportion the allocated data size according to the contracted capacity. In other words, with the above-described conventional technique, there is the method of setting a lower limit value in order to prevent divergence. In this case, however, fair distribution of bandwidth between the ONUs for which the excess allocated data size has arrived at the lower limit value is difficult. In contrast, with the present invention, this type of problem does not occur. Furthermore, with the conventional technique, in order to prevent divergence, there is the method of calculating the excess allocated data size according to the moving average value of the difference between the allocated data size and the target data size over a fixed time period, in this case. In this case, although it is possible to avoid the excess allocated data size diverging, it is necessary to store the differences between the allocated data size and the target data size for all of the cycles within the fixed time period, so that a large memory capacity is required. In contrast, with the present invention, it is possible to avoid this problem.

Furthermore, with the dynamic bandwidth allocation method according to the present invention, there may be included a step of calculating the ideal allocated data sizes (ideal$_{j,k}$) according to ideal$_{j,k}$=target$_{j,k}$−excess$_{j,k-1}$; and a step of calculating the excess allocated data sizes (excess$_{j,k}$) according to excess$_{j,k}$=α·(allocated$_{j,k}$−ideal$_{j,k}$).

With such steps, there is no great consumption of memory capacity, and there is no divergence of the values of parameters, so that, along with it becoming possible to apportion the allocated data size according to the contracted capacity, it is also possible to alleviate the load of calculation processing.

Furthermore, with the dynamic bandwidth allocation method according to the present invention, there may be included: a step of receiving request data sizes corresponding to the plurality of optical network units; a step of calculating maximum target data sizes corresponding to the target data sizes in proportion to maximum limit bandwidths; a step of calculating guaranteed target data sizes in proportion to minimum guaranteed bandwidths; a step of setting a time constant for maximum bandwidth and a time constant for guaranteed bandwidth as the exponential weighted moving average time constant; a step of calculating excess allocated data sizes for maximum bandwidth, ideal allocated data sizes for maximum bandwidth, excess allocated data sizes for guaranteed bandwidth, and ideal allocated data sizes for guaranteed bandwidth, which correspond to the excess allocated data sizes and the ideal allocated data sizes; a step of determining a condition not to grant bandwidth allocation, if the ideal allocated data sizes for maximum bandwidth ($max\_ideal_{j,k}$) satisfies $max\_ideal_{j,k}<0$; and a step of constructing an allocation order list by sorting numbers of the optical network units in order of smallness of values obtained by dividing excess allocated data sizes for guaranteed bandwidth for the respective optical network units by guaranteed bandwidths; and allocating the request data sizes from the head of the allocation order list which has been calculated in a previous cycle, for the optical network units for which bandwidth allocation has been granted by the condition, while taking a preset upper limit value for total data size which can be allocated in one cycle as an upper limit.

With such steps, it is possible to set a parameter for guaranteed bandwidth and a parameter for maximum bandwidth, and thus it is possible to perform various different types of maximum bandwidth limitation and minimum bandwidth guarantee.

Furthermore, with the dynamic bandwidth allocation method according to the present invention, there may be included a step of obtaining the guaranteed target data sizes by proportionally apportioning a data area which can be allocated in one cycle between the optical network units for which bandwidth requests have occurred in the present cycle, in proportion to the minimum guaranteed bandwidths; taking the guaranteed target data sizes of the optical network units which exceed the maximum limit bandwidths as being limited by the maximum target data sizes, and reapportioning differences between the guaranteed target data sizes and the maximum target data sizes in proportion to the minimum guaranteed bandwidths between the optical network units which have not yet reached maximum; and repeating reapportionment until the guaranteed target data sizes of all of the optical network units become less than or equal to the maximum target data sizes.

With such steps, it is possible to perform maximum bandwidth limitation and minimum bandwidth guarantee.

Furthermore, with the dynamic bandwidth allocation method according to the present invention, there may be included a step of setting each of the time constant for maximum bandwidth and the time constant for guaranteed bandwidth to independent and arbitrary values; and a step of setting the value of the time constant for maximum bandwidth so that it becomes greater than the value of the time constant for guaranteed bandwidth.

With such steps, it is possible to implement an appropriate bandwidth limitation function, according to the state of bandwidth congestion.

Furthermore, with the dynamic bandwidth allocation method according to the present invention, there may be included a step of defining, as a maximum bandwidth limitation function, a function of, when obtaining the guaranteed target data sizes by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth ($max\_ideal_{j,k}$) satisfies $max\_ideal_{j,k}<0$; a step of turning the maximum bandwidth limitation function ON and OFF dynamically; and a step of turning the maximum bandwidth limitation function OFF for all subordinate optical network units, if no signal is received from a host network indicating a transition from no congestion being present to congestion being present; turning the maximum bandwidth limitation function ON for all the optical network units, if a signal has been received indicating the occurrence of congestion; and again turning the maximum bandwidth limitation function OFF, after a fixed time period has elapsed.

With such steps, it becomes possible to turn the maximum bandwidth limitation function ON during a fixed time period after the receipt of a signal showing the transition from no congestion being present to congestion being present, and it becomes possible to limit bandwidth only for heavy users who are continually taking up bandwidth.

Furthermore, with the dynamic bandwidth allocation method according to the present invention, there may be included a step of defining, as a maximum bandwidth limitation function, a function of, when obtaining the guaranteed target data sizes by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth ($max\_ideal_{j,k}$) satisfies $max\_ideal_{j,k}<0$; a step of turning the maximum bandwidth limitation function ON and OFF dynamically; and a step of turning the maximum bandwidth limitation function OFF for all subordinate optical network units, if no signal is received from a host network indicating a congested state, or if a signal is received from the host network indicating that the congested state has been cleared up; and of turning the maximum bandwidth limitation function ON for all the optical network units, if a signal has been received indicating the congested state.

With such steps, it becomes possible to turn the maximum bandwidth limitation function ON only when a signal is received which indicates a congested state, and to turn the maximum bandwidth limitation function OFF while no signal which indicates a congested state is being received, or while a signal is being received which shows that the congested state has been cleared up; so that it becomes possible to limit bandwidth only for heavy users who are continually taking up bandwidth.

Furthermore, with the dynamic bandwidth allocation method according to the present invention, there may be included: a step of defining, as a maximum bandwidth limitation function, a function of, when obtaining the guaranteed target data sizes by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth (max_ideal$_{j,k}$) satisfies max_ideal$_{j,k}$<0; a step of turning the maximum bandwidth limitation function ON and OFF dynamically; and a step of turning the maximum bandwidth limitation function ON, if it has been determined that a congested state is present from a size of upstream traffic which the optical line terminal has received, and of turning the maximum bandwidth limitation function OFF, if it has been determined that the congested state has been cleared up.

With such steps, it becomes possible for the optical line terminal itself to determine upon the congested state, and to turn the maximum bandwidth limitation function ON and OFF, so that it becomes possible to limit bandwidth only for heavy users who are continually taking up bandwidth.

Furthermore, with the dynamic bandwidth allocation method according to the present invention, there may be included: a step of defining, as a maximum bandwidth limitation function, a function of, when obtaining the guaranteed target data sizes by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth (max_ideal$_{j,k}$) satisfies max_ideal$_{j,k}$<0; a step of turning the maximum bandwidth limitation function ON and OFF dynamically; and a step of setting a maximum bandwidth limitation starting time instant and a maximum bandwidth limitation ending time instant for a timer which is provided in the optical line terminal, and of turning the maximum bandwidth limitation function ON when the starting time instant arrives, and of turning the maximum bandwidth limitation function OFF when the ending time instant arrives.

With such steps, it is possible to perform the ON and OFF control of the maximum bandwidth limitation function by setting the time period of the timer.

Furthermore, the computer program according to the present invention is one for causing a computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute: a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle); an ideal allocated data size calculation step which calculates ideal allocated data sizes (ideal$_{j,k}$) according to ideal$_{j,k}$=target$_{j,k}$−($\alpha$/(1−$\alpha$))·excess$_{j,k-1}$, where $\tau$ is an exponential weighted moving average time constant, and $\alpha$=($\tau$−1)/($\tau$+1); an excess allocated data size calculation step which calculates excess allocated data sizes (excess$_{j,k}$) for one cycle according to excess$_{j,k}$=$\alpha$·excess$_{j,k-1}$+(1·$\alpha$)·(allocated$_{j,k}$−target$_{j,k}$); and a bandwidth allocation calculation step which does not grant bandwidth allocation if ideal$_{j,k}$<0.

Furthermore, the recording medium which can be read by a computer according to the present invention is one that stores a program for causing the computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute: a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle); an ideal allocated data size calculation step which calculates ideal allocated data sizes (ideal$_{j,k}$) according to ideal$_{j,k}$=target$_{j,k}$−($\alpha$/(1−$\alpha$))·excess$_{j,k-1}$, where $\tau$ is an exponential weighted moving average time constant, and $\alpha$=($\tau$−1)/($\tau$+1); an excess allocated data size calculation step which calculates excess allocated data sizes (excess$_{j,k}$) for one cycle according to excess$_{j,k}$=$\alpha$·excess$_{j,k-1}$+(1−$\alpha$)·(allocated$_{j,k}$−target$_{j,k}$); and a bandwidth allocation calculation step which does not grant bandwidth allocation if ideal$_{j,k}$<0.

Furthermore, the computer program according to the present invention is one for causing a computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute: a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle); an ideal allocated data size calculation step which calculates ideal allocated data sizes (ideal$_{j,k}$) according to ideal$_{j,k}$=target$_{j,k}$−excess$_{j,k-1}$; an excess allocated data size calculation step which calculates excess allocated data sizes (excess$_{j,k}$) for one cycle according to excess$_{j,k}$=$\alpha$·(allocated$_{j,k}$−ideal$_{j,k}$), where $\tau$ is an exponential weighted moving average time constant, and $\alpha$=($\tau$−1)/($\tau$+1); and a bandwidth allocation calculation step which does not grant bandwidth allocation if ideal$_{j,k}$<0.

Furthermore, the recording medium which can be read by a computer according to the present invention is one that stores a program for causing the computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute: a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle); an ideal allocated data size calculation step which calculates ideal allocated data sizes (ideal$_{j,k}$) according to ideal$_{j,k}$=target$_{j,k}$−excess$_{j,k-1}$; an excess allocated data size calculation step which calculates excess allocated data sizes (excess$_{j,k}$) for one cycle according to excess$_{j,k}$=α·(allocated$_{j,k}$−ideal$_{j,k}$), where τ is an exponential weighted moving average time constant, and α=(τ−1)/(τ+1); and a bandwidth allocation calculation step which does not grant bandwidth allocation if ideal$_{j,k}$<0.

Effects of the Invention

As has been explained above, with the dynamic bandwidth allocation circuit and the dynamic bandwidth allocation method according to the present invention, the excess allocated data size up to the previous cycle is calculated by the exponential weighted moving average of the difference between the allocated data size and the target data size in each cycle, and the ideal allocated data size is obtained based upon the target data size and the excess allocated data size, and bandwidth is allocated. Specifically, a target data size (target$_{j,k}$) for each cycle is calculated for each of the ONUs, and, based upon the time constant of the exponential weighted moving average and the excess allocated data size (excess$_{j,k}$), the excess allocated data size (excess$_{j,k}$) per one cycle is calculated according to excess$_{j,k}$=α·excess$_{j,k-1}$+(1−α)·(allocated$_{j,k}$−target$_{j,k}$), and the ideal allocated data size (ideal$_{j,k}$) is calculated according to ideal$_{j,k}$=target$_{j,k}$−(α/(1−α))·excess$_{j,k-1}$. Then, the determination condition that bandwidth allocation is not granted if ideal$_{j,k}$<0 is used for bandwidth allocation.

With such an operation, there is no very great consumption of memory capacity, and the values of the parameters are not caused to diverge, so that it becomes possible to apportion the allocated data size according to the contracted capacity. In other words, with the above-described conventional technique, there is the method of setting a lower limit value in order to prevent divergence. In this case, however, fair distribution of bandwidth between the ONUs for which the excess allocated data size has arrived at the lower limit value is difficult. In contrast, with the present invention, this type of problem does not occur. Furthermore, with the conventional technique, in order to prevent divergence, there is the method of calculating the excess allocated data size according to the moving average value of the difference between the allocated data size and the target data size over a fixed time period, in this case. In this case, although it is possible to avoid the excess allocated data size diverging, it is necessary to store the differences between the allocated data size and the target data size for all of the cycles within the fixed time period, so that a large memory capacity is required. In contrast, with the present invention, it is possible to avoid this problem.

Furthermore, with the dynamic badnwidth allocation circuit and the dynamic bandwidth allocation method according to the present invention, the ideal allocated data size (ideal$_{j,k}$) is calculated according to ideal$_{j,k}$=target$_{j,k}$−excess$_{j,k-1}$; and the excess allocated data size (excess$_{j,k}$) is calculated according to the excess$_{j,k}$=α·(allocated$_{j,k}$−ideal$_{j,k}$).

With such an operation, there is no great consumption of memory capacity, and there is no divergence of the values of parameters, so that, along with it becoming possible to apportion the allocated data size according to the contracted capacity, it is also possible to alleviate the load of calculation processing.

Furthermore, with the dynamic bandwidth allocation circuit and the dynamic bandwidth allocation method according to the present invention, the two parameters excess allocated data size for guaranteed bandwidth and excess allocated data size for maximum bandwidth are employed, and various different types of maximum bandwidth setting function are implemented by the setting of the exponential weighted moving average time constant used in the calculation of the excess allocated data size for maximum bandwidth. To this end, the dynamic bandwidth allocation circuit receives request data sizes from each of the ONUs, calculates target data sizes for maximum bandwidth in proportion to maximum limit bandwidths, calculates target data sizes for guaranteed bandwidth in proportion to minimum guaranteed bandwidths, and sets a time constant for maximum bandwidth and a time constant for guaranteed bandwidth as the exponential weighted moving average time constant. Furthermore, along with calculating an excess allocated data size for maximum bandwidth and an ideal allocated data size for maximum bandwidth, an excess allocated data size for guaranteed bandwidth and an ideal allocated data size for guaranteed bandwidth are also calculated. Subsequently, if the ideal allocated data size for maximum bandwidth (max ideal$_{j,k}$) satisfies max ideal$_{j,k}$<0, then the determination of condition not to grant bandwidth allocation is performed, and the request data sizes are allocated to the ONUs.

With such an operation, it is possible to set a parameter for guaranteed bandwidth and a parameter for maximum bandwidth, and thus it is possible to perform various different types of maximum bandwidth limitation and minimum bandwidth guarantee.

Furthermore, with the dynamic bandwidth allocation circuit and the dynamic bandwidth allocation method according to the present invention, the guaranteed target data size is obtained by proportionally apportioning a data area which can be allocated in one cycle between the optical network units for which bandwidth requests have occurred in the present cycle, in proportion to minimum guaranteed bandwidths; the guaranteed target data sizes of the optical network units which exceed the maximum limit bandwidth are taken as being limited by the maximum target data sizes, and the difference between them is reapportioned in proportion to minimum guaranteed bandwidths between the optical network units which have not yet reached maximum; and reapportionment is repeated until the guaranteed target data sizes of all the optical network units become less than or equal to the maximum target data sizes.

With such an operation, it is possible to perform maximum bandwidth limitation and minimum bandwidth guarantee.

Furthermore, with the dynamic bandwidth allocation circuit and the dynamic bandwidth allocation method according to the present invention, it is possible to set each of the time constant for maximum bandwidth and the time constant for guaranteed bandwidth, independently to arbitrary values; and the time constant for maximum bandwidth is set to be greater than the time constant for guaranteed bandwidth.

With such an operation, it is possible to implement an appropriate bandwidth limitation function, according to the state of bandwidth congestion.

Furthermore, with the dynamic bandwidth allocation circuit and the dynamic bandwidth allocation method according to the present invention, as a maximum bandwidth limitation function, there are defined a function of taking the guaranteed target data sizes of the optical network units which exceed the maximum limit bandwidth as being limited by the maximum target data sizes, and reapportioning the difference between them in proportion to minimum guaranteed bandwidths between the optical network units which have not yet reached maximum; and a condition determination function of not granting bandwidth allocation, if the ideal allocated data size for maximum bandwidth (max_ideal$_{j,k}$) satisfies max_ ideal$_{j,k}$<0; and it is made possible to turn the maximum bandwidth limitation function ON and OFF dynamically; and the maximum bandwidth limitation function is turned OFF for all subordinate optical network units, when no signal is received from a host network indicating the transition from no congestion being present to congestion being present; while the maximum bandwidth limitation function is turned ON for all the optical network units, when a signal has been received indicating the occurrence of congestion; and the maximum bandwidth limitation function is again turned OFF, after a fixed time period has elapsed.

With such an operation, it becomes possible to turn the maximum bandwidth limitation function ON during a fixed time period after the receipt of a signal showing the transition from no congestion being present to congestion being present, and it becomes possible to limit bandwidth only for heavy users who are continually taking up bandwidth.

Furthermore, with the dynamic bandwidth allocation circuit and the dynamic bandwidth allocation method according to the present invention, it is made possible to turn the above-described maximum bandwidth limitation function dynamically ON and OFF, and the maximum bandwidth limitation function is turned OFF for all subordinate optical network units, when no signal is received from a host network indicating a congested state, or when a signal is received from the host network indicating that the congested state has been cleared up; and the maximum bandwidth limitation function is turned ON for all the optical network units, if a signal has been received indicating the congested state.

With such an operation, it becomes possible to turn the maximum bandwidth limitation function ON only when a signal is received which indicates a congested state, and to turn the maximum bandwidth limitation function OFF while no signal which indicates a congested state is being received, or while a signal is being received which shows that the congested state has been cleared up; so that it becomes possible to limit bandwidth only for heavy users who are continually taking up bandwidth.

Furthermore, with the dynamic bandwidth allocation circuit and the dynamic bandwidth allocation method according to the present invention, it is made possible to turn the above-described maximum bandwidth limitation function dynamically ON and OFF, and the maximum bandwidth limitation function is turned ON if it has been determined from the size of upstream traffic which the optical line terminal (OLT) has received that a congested state is present; while the maximum bandwidth limitation function is turned OFF, if it has been determined that the congested state has been cleared up.

With such an operation, it becomes possible for the optical line terminal itself to determine upon the congested state, and to turn the maximum bandwidth limitation function ON and OFF, so that it becomes possible to limit bandwidth only for heavy users who are continually taking up bandwidth.

Furthermore, with the dynamic bandwidth allocation circuit and the dynamic bandwidth allocation method according to the present invention, it is made possible to turn the above-described maximum bandwidth limitation function dynamically ON and OFF, and a maximum bandwidth limitation starting time instant and a maximum bandwidth limitation ending time instant are set for a timer which is comprised inside the optical line terminal, and the maximum bandwidth limitation function is turned ON when the starting time instant arrives, and is turned OFF when the ending time instant arrives.

With such an operation, it is possible to perform the ON and OFF control of the maximum bandwidth limitation function by setting the time period of the timer.

BRIEF DESCRIPTION OF DRAWINGS

FIG. 7 is a figure showing the topology in a dynamic bandwidth allocation circuit which employs a conventional method.

Figure 1:
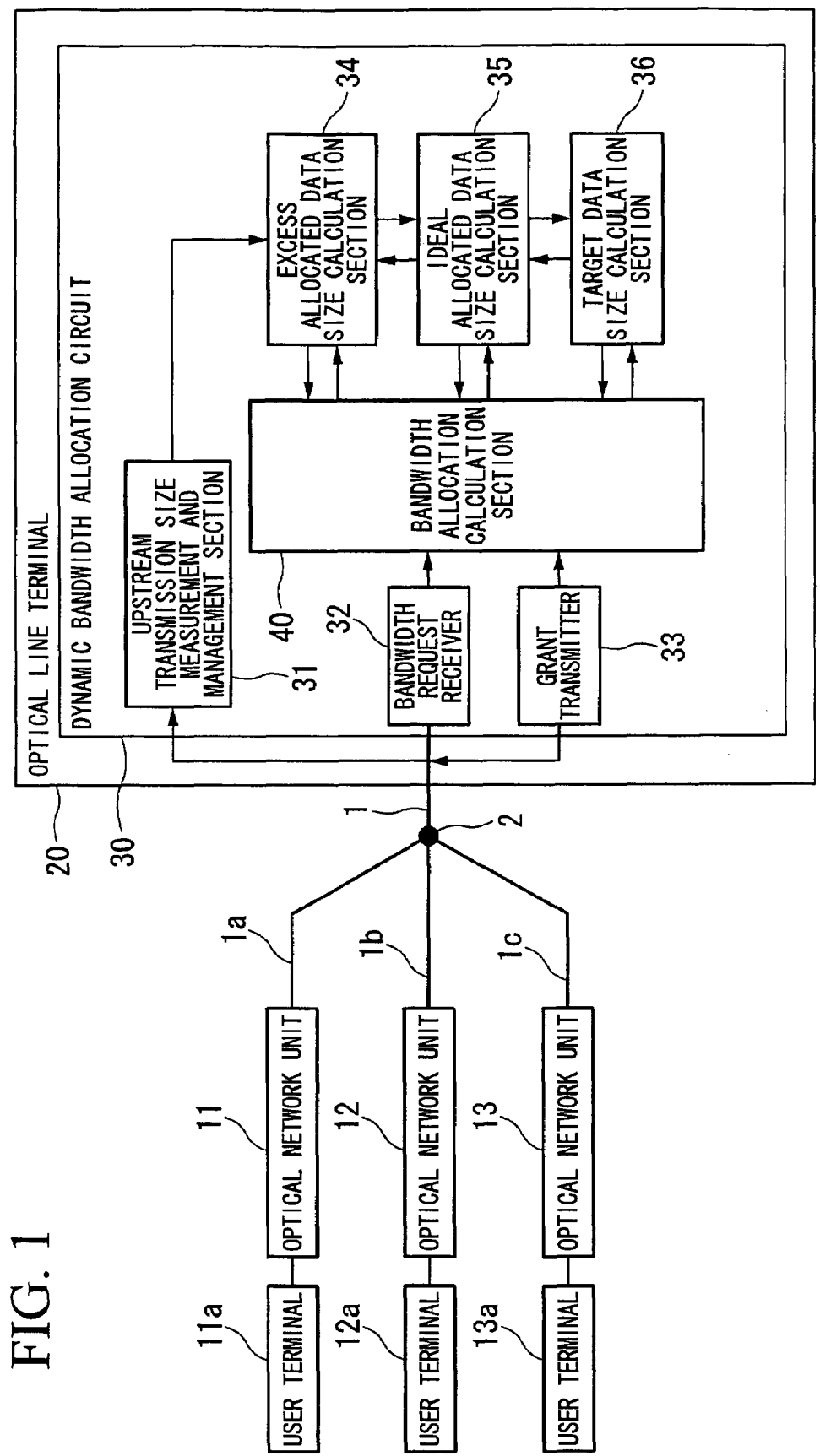
FIG. 1 is a figure showing an example of the system structure of the first preferred embodiment according to the present invention.

EXPLANATION OF THE REFERENCE SYMBOLS 1, 1a, 1b, 1c optical fiber
2 optical branching section
11, 12, 13 optical network unit (ONU)
11a, 12a, 13a user terminal
20 optical line terminal
30, 30a, 30b dynamic bandwidth allocation circuit
31 upstream transmission size measurement and management section
32 bandwidth request receiver
33 grant transmitter
34 excess allocated data size calculation section
35 ideal allocated data size calculation section
36 target data size calculation section
40 bandwidth allocation calculation section
51 excess allocated data size calculation section for maximum bandwidth
52 ideal allocated data size calculation section for maximum bandwidth
53 target data size calculation section for maximum bandwidth
61 excess allocated data size calculation section for guaranteed bandwidth
62 ideal allocated data size calculation section for guaranteed bandwidth
63 target data size calculation section for guaranteed bandwidth
70 maximum bandwidth limitation function
j optical network unit (ONU) number
k cycle
$\text{target}_{j,k}$ target data size for ONU #j for cycle k
$\text{ideal}_{j,k}$ ideal allocated data size for ONU #j for cycle k
$\text{excess}_{j,k}$ excess allocated data size for ONU #j for cycle k
$\text{bw\_min}_j$ minimum guaranteed bandwidth for ONU #j
$\text{max\_target}_{j,k}$ target data size for maximum bandwidth for ONU #j for cycle k
$\text{min\_target}_{j,k}$ target data size for guaranteed bandwidth for ONU #j for cycle k
$\text{max\_ideal}_{j,k}$ ideal allocated data size for maximum bandwidth for ONU #j for cycle k
$\text{min\_ideal}_{j,k}$ ideal allocated data size for guaranteed bandwidth for ONU #j for cycle k max_excess$_{j,k}$ excess allocated data size for maximum bandwidth for ONU #j for cycle k min_excess$_{j,k}$ excess allocated data size for guaranteed bandwidth for ONU #j for cycle k

BEST MODE FOR CARRYING OUT THE INVENTION

Next, best modes for carrying out the present invention will be explained with reference to the drawings.

The First Preferred Embodiment

FIG. 1 is a figure showing the system structure of the first preferred embodiment according to the present invention, and this is a P2MP system which allocates bandwidths dynamically according to the contracted bandwidth of the sources of requests, when a transmission bandwidth from optical network units (simply termed "ONU"s) 11, 12, and 13 to an optical line terminal (simply termed an "OLT") is shared by a plurality of ONUs or service paths. Here the term "ONU" does not necessarily denote a physical device; it would also be possible for a plurality of logical ONUs to be present within a single physical device, which is a unit for bandwidth control with a dynamic bandwidth allocation circuit according to the present invention.

An optical fiber 1 which is connected to the OLT 20 is branched by an optical branching section 2 into a plurality of fibers 1a, 1b, and 1c, and these are respectively connected to the ONUs 11, 12, and 13. Data which is transmitted from user terminals 11a, 12a, and 13a to the ONUs 11, 12, and 13 is accumulated in buffers (not shown in the figure), and the buffering sizes are transmitted from the ONUs 11, 12, and 13 to the OLT 20 as request data sizes. It should be understood that, here, it may also be the case that an upper limit value is set for the buffering sizes which are requested. A bandwidth allocation for the next cycle is performed, on each cycle and for each of the ONUs, by a dynamic bandwidth allocation circuit 30 which is provided inside the OLT 20.

Request data sizes are received during a fixed bandwidth request reception time period from the ONUs 11, 12, and 13 by the dynamic bandwidth allocation circuit 30 of the OLT 20 with a bandwidth request receiver 32, and these received request data sizes are transmitted to a bandwidth allocation calculation section 40.

An upstream transmission size measurement and management section 31 counts the actually transmitted data sizes for each request source. An excess allocated data size calculation section 34 calculates the data size which, in the past, was allocated to excess, but may also compensate the excess allocated bandwidth according to the difference between the allocated data size and the actual transmitted data size which has been measured by the upstream transmission size measurement and management section 31.

A target data size calculation section 36 calculates the target data sizes which should be allocated in one cycle, based upon the contracted capacities and services of the users who are connected to each of the ONUs 11, 12, and 13. An ideal allocated data size calculation section 35 obtains the ideal allocated data size by subtracting the excess allocated data size from the target data size.

The bandwidth allocation calculation section 40 performs calculation of bandwidth allocation sizes and scheduling of allocation order, and transmits the transmission data size which is granted to be transmitted and the transmission instant to each of the ONUs via a grant transmitter 33, and repeats this series of operations cyclically.

Figure 2:
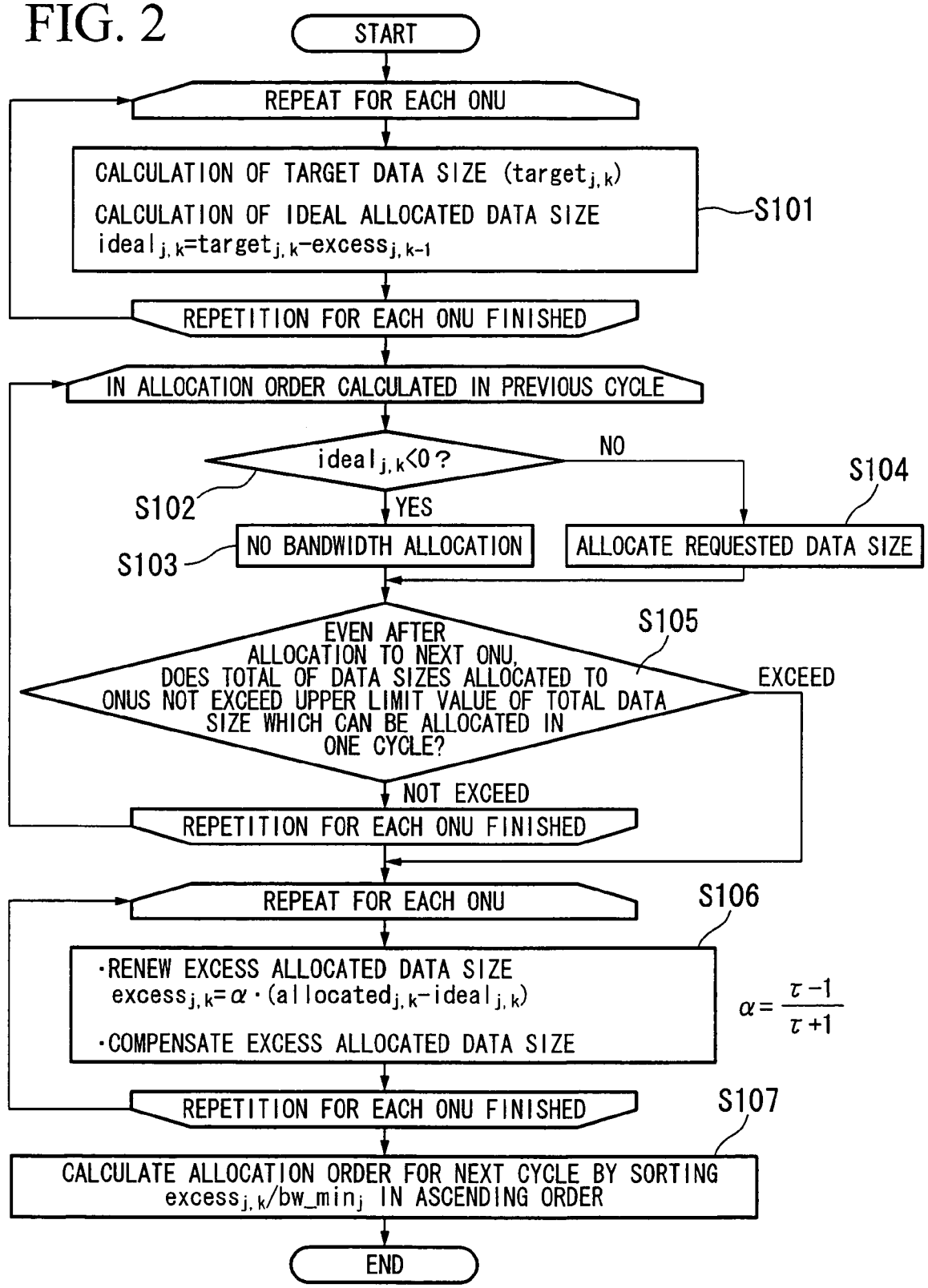
FIG. 2 is a figure showing the bandwidth allocation calculation flow in the first preferred embodiment according to the present invention.

FIG. 2 is a figure showing the bandwidth allocation calculation flow in this first preferred embodiment according to the present invention, and shows the processing flow of an algorithm for bandwidth allocation. Furthermore, the meaning of the various symbols of data which are used in FIG. 2 are as follows.

For these symbols: "j" is the ONU number, "k" is the cycle, "target$_{j,k}$" is the target data size for ONU #j for cycle k; "ideal$_{j,k}$" is the ideal allocated data size for ONU #j for cycle k; "excess$_{j,k}$" is the excess allocated data size for ONU #i for cycle k; "bw_min$_j$" is the minimum guaranteed bandwidth for ONU #j; and "allocated$_{j,k}$" is the allocated data size for ONU #j for cycle k.

In FIG. 2, first, the target data sizes which should be allocated for one cycle are calculated based upon the contracted capacities and services of the users who are respectively connected to the ONUs 11, 12, and 13. For example, when apportioning all the bandwidths proportionally in proportion to guaranteed bandwidth between the ONUs which are being used at this time point, the target data size (target$_{j,k}$ where j: ONU number and k: cycle) is obtained by apportioning the data area which can be allocated in one cycle proportionally between the ONUs which have requested bandwidth at that time point, in the proportion of guaranteed bandwidth. Next, the ideal allocated data size (ideal$_{j,k}$) is obtained by subtracting the excess allocated data size (excess$_{j,k-1}$) for the previous cycle from the target data size, so that "ideal$_{j,k}$=target$_{j,k}$−excess$_{j,k-1}$" (in the step S101).

Next, request data sizes are allocated only to the ONUs for which "ideal$_{j,k}$>=0" is satisfied, in the allocation order which was calculated in the previous calculation cycle, (in the steps S102, S103, and S104). Furthermore, allocation is stopped (in the step S105) before the total value of allocation size in the present cycle attains the upper limit value for the total data size which can be allocated in one cycle.

After the determination of the allocated data size (allocated$_{j,k}$), the excess allocated data size is calculated by multiplying the difference between the allocated data size and the ideal data size by a coefficient α. This coefficient α is calculated by α=(τ−1)/(τ+1). Here, τ is the time constant of the exponential weighted moving average (EWMA). If the allocated data size (allocated$_{j,k}$) for the present cycle and the upstream transmitted data size (transmitted$_{j,k}$) which is actually transmitted are different, then the excess allocated data size is compensated (in the step S106) by subtracting, from the excess allocated data size in the next cycle and subsequently, the value obtained by multiplying the value, obtained by subtracting the latter from the former, by the coefficient α the necessary number of times. It should be understood that the time constant s assumes a value which is greater than 1; for example, when τ is 1000, α becomes about 0.998.

Here, the reason for multiplying by the coefficient α "the necessary number of times" will be explained. The time period (the number of cycles) from when the optical line terminal issues grant to when the compensation of the excess allocated data size is actually reflected varies, depending upon the implementation of the dynamic bandwidth allocation circuit. That is, it sometimes happens that it is possible to reflect it at the timing of next issuing grant; and it sometimes also happens that, since, in hardware terms, it is not possible to be in time to reflect it at the next grant timing, it is reflected at a subsequent grant timing. For example, if it is reflected three cycles after the issuance of the grant, then it should be multiplied three times by the coefficient α.

Finally, the numbers of the ONUs are sorted in order of smallness of the values obtained by dividing the excess allocated data sizes (excess$_{j,k}$) for each of the ONUs by the minimum guaranteed bandwidth (bw_min$_j$). This is used as the allocation order for the next cycle. (The step S107)

By repeating the above-described calculation in each cycle, no large amount of memory capacity is consumed; and furthermore, the values of the parameters are not caused to diverge, and it becomes possible to apportion the allocated data size according to contracted capacity.

It should be understood that, according to the formula for the exponential weighted moving average which is normally used, the excess allocated data size is calculated by excess$_{j,k}$=α·excess$_{j,k-1}$+(1−α)·(allocated$_{j,k}$−target$_{j,k}$). In this case, the ideal allocated data size is calculated by ideal$_{j,k}$=target$_{j,k}$−(α/(1−α))·excess$_{j,k-1}$. However, in this preferred embodiment, as described above, along with calculating the ideal allocated data size by ideal$_{j,k}$=target$_{j,k}$−excess$_{j,k-1}$, the excess allocated data size is calculated by excess$_{j,k}$=α·(allocated$_{j,k}$−ideal$_{j,k}$).

The Second Preferred Embodiment

Figure 3:
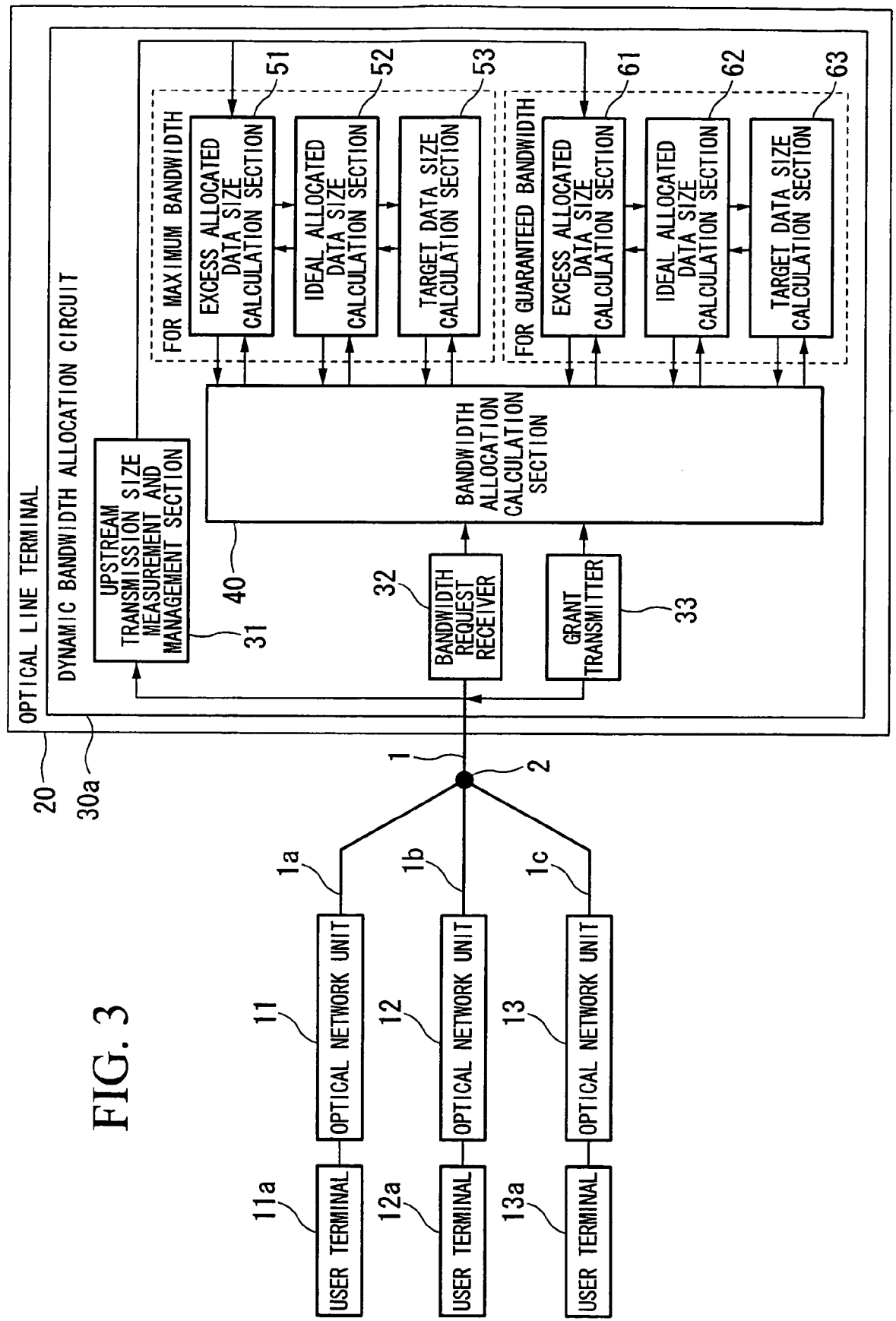
FIG. 3 is a figure showing an example of the system structure of the second preferred embodiment according to the present invention.

FIG. 3 is a figure showing an example of the system structure of the second preferred embodiment according to the present invention. In the example shown in FIG. 3, a dynamic bandwidth allocation circuit 30a is provided with: an excess allocated data size calculation section 51 for maximum bandwidth; an ideal allocated data size calculation section 52 for maximum bandwidth; a target data size calculation section 53 for maximum bandwidth; an excess allocated data size calculation section 61 for guaranteed bandwidth; an ideal allocated data size calculation section 62 for guaranteed bandwidth; and a target data size calculation section 63 for guaranteed bandwidth.

Maximum bandwidth limitation and minimum bandwidth guarantee are performed, using both the parameters target data size, time constant, excess allocated data size, and ideal allocated data size for maximum bandwidth, and the parameters target data size, time constant, excess allocated data size, and ideal allocated data size for guaranteed bandwidth.

Figure 4:
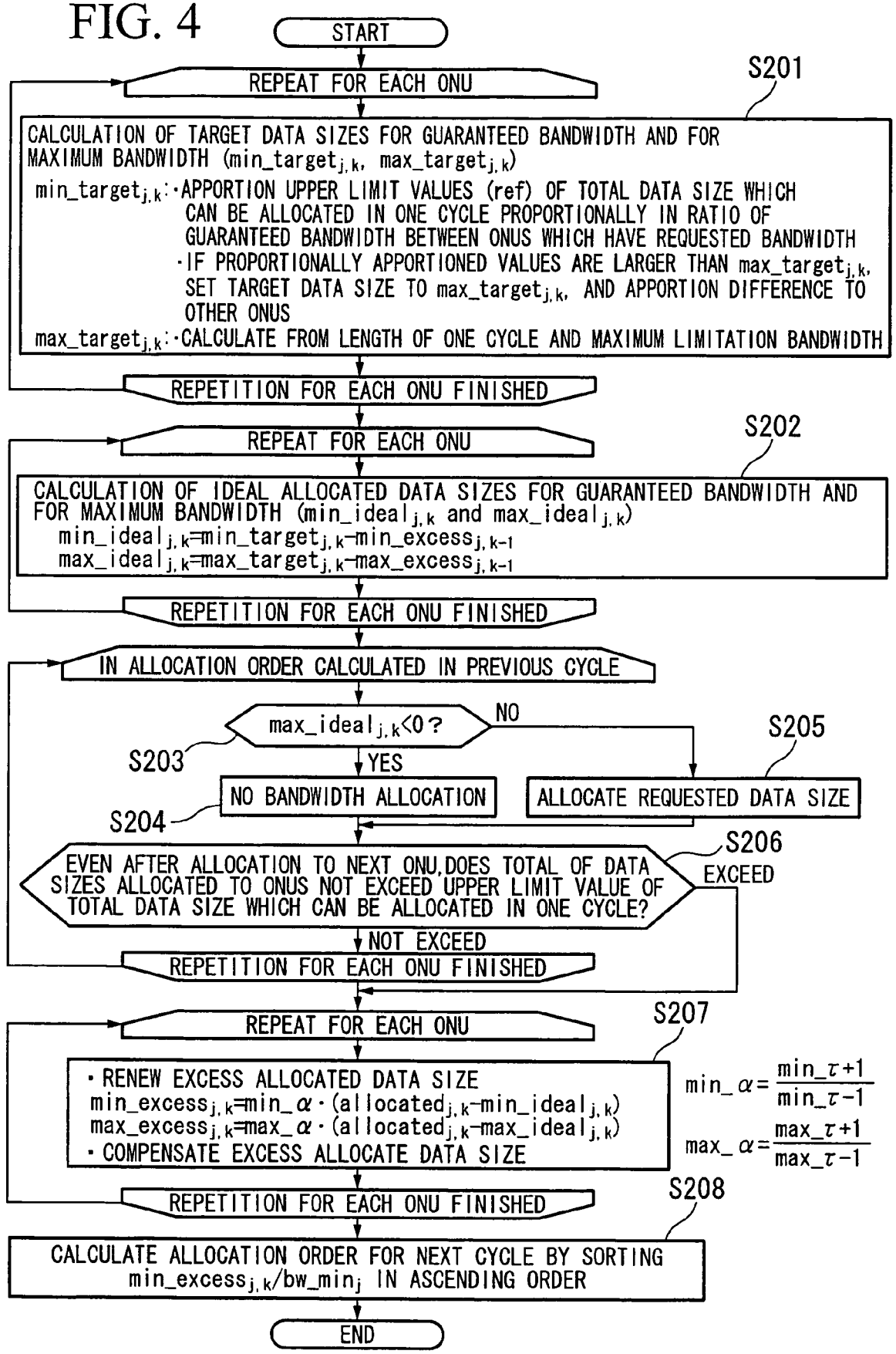
FIG. 4 is a figure showing the bandwidth allocation calculation flow in the second preferred embodiment according to the present invention.

FIG. 4 is a figure showing the bandwidth allocation calculation flow in this second preferred embodiment according to the present invention, and shows the processing flow of an algorithm for bandwidth allocation. Furthermore, the meanings of the various symbols which are used in FIG. 4 are as follows.

For these symbols: "j" is the ONU number, "k" is the cycle, "max_target$_{j,k}$" is the target data size for maximum bandwidth for ONU #j for cycle k; "min_target$_{j,k}$" is the target data size for guaranteed bandwidth for ONU #j for cycle k; "max_ideal$_{j,k}$" is the ideal allocated data size for maximum bandwidth for ONU #j for cycle k; "min_ideal$_{j,k}$" is the ideal allocated data size for guaranteed bandwidth for ONU #j for cycle k; "max_excess$_{j,k}$" is the excess allocated data size for maximum bandwidth for ONU #j for cycle k; "min_excess$_{j,k}$" is the excess allocated data size for guaranteed bandwidth for ONU #j for cycle k; "bw_max$_j$" is the maximum bandwidth limitation for ONU #j; and "bw_min$_j$" is the minimum guaranteed bandwidth for ONU #j.

Referring to FIG. 4, first, the target data size for maximum bandwidth (max_target$_{j,k}$) is calculated from the length of one cycle and the maximum bandwidth limitation. Furthermore, the target data size for guaranteed bandwidth is obtained by apportioning the data area which can be allocated in one cycle between the ONUs which have requested bandwidth at this time point proportionally in proportion to guaranteed bandwidth. Here, if the value which has been proportionally apportioned is larger than the target data size for maximum bandwidth, then the target data size for guaranteed bandwidth is set to the target data size for maximum bandwidth, and the difference between them is reapportioned proportionally in proportion to minimum guaranteed bandwidth between the ONUs for which the limit has not yet been reached; and the above-described reapportionments are repeated (in the step S201) until, for all the ONUs, the target data size for guaranteed bandwidth becomes less than or equal to the target data size for maximum bandwidth. It should be understood that the ratios of minimum guaranteed bandwidth are predetermined ratios which are calculated based upon the contents of the contracts for the various users.

Next, the ideal allocated data sizes for maximum bandwidth and for guaranteed bandwidth are both calculated by the method described in the first preferred embodiment (in the step S202).

Next, request data sizes are allocated only for those ONUs for which "max_ideal$_{j,k}$>=0" is satisfied, in the allocation order which was calculated in the previous calculation cycle,. The method for determining the other allocated data sizes is the same as in the first preferred embodiment (in the steps S203, S204, S205, and S206).

After having determined the allocated data size (allocated$_{j,k}$), for the maximum bandwidth, the excess allocated data size for maximum bandwidth is calculated by multiplying the difference between the allocated data size and the ideal data size by a coefficient max_α, and, for the guaranteed bandwidth, the excess allocated data size for guaranteed bandwidth is calculated by multiplying the difference between the allocated data size and the ideal data size by a coefficient min_α. These coefficients max_α and min_α are calculated as max_α=(max_τ−1)/(max_τ+1) and min_α=(min_τ−1)/(min_τ+1), respectively. Here, max_τ and min_τ are the exponential weighted moving average time constants for maximum bandwidth and for guaranteed bandwidth, respectively (the step S207).

Finally, the numbers of the ONUs are sorted in order of smallness of the values obtained by dividing the excess allocated data sizes for guaranteed bandwidth for each of the ONUs by the minimum guaranteed bandwidth. This is used as the order of allocation for the next cycle (the step S208).

Furthermore, since the data size which has been allocated to each of the ONUs and the transmitted data size which is actually transmitted are sometimes different, the actually transmitted data size is measured and managed for each ONU by an upstream transmission size measurement and management section 31 provided in the dynamic bandwidth allocation circuit 30a, and the value which is obtained by multiplying the difference between the allocated bandwidth and the actually transmitted data size by the coefficient α the necessary number of times is reflected in the calculation of the excess allocated data size for the next and subsequent cycles.

It should be understood that, here, each of the time constants max_τ and min_τ can be set to any desired number of cycles. In particular, it is possible to implement various maximum bandwidth limitation functions according to the setting of the value of max_τ. First, the operation when max_τ is set to a very large value in comparison to min_τ will be explained.

For an ONU upon which a high load user is accommodated who continues to demand transmission of a large size of upstream data which exceeds the maximum bandwidth, a long term average of the transmitted data size approaches the maximum bandwidth, since the exponential weighted moving average of the transmitted data size which has been calculated over the long time period of the time constant max_τ is controlled so that it does not exceed the exponential weighted moving average of the target data size for maximum bandwidth.

On the other hand, for an ONU upon which a user is accommodated who sporadically imposes a high load although the normal input is zero, while the input is zero, max_excess continues to drop, while, by contrast, max_ideal continues to increase. If input has started after max_ideal has increased sufficiently, since bandwidth allocation is granted while max_ideal is greater than or equal to zero, it is possible to allocate more than or equal to the maximum bandwidth within some fixed time period. However, when the high load state continues, max_ideal becomes negative, and control is imposed so that a long term average of the bandwidth allocation approached the maximum bandwidth. If max_$\tau$ has been set to a small value, although max_ideal increases if the input is not started for a long time period, when the input starts, max_ideal becomes negative in a short time period and thereafter bandwidth continues to be allocated for a predetermined interval, so that a shaping function can be implemented.

The Third Preferred Embodiment

Figure 5:
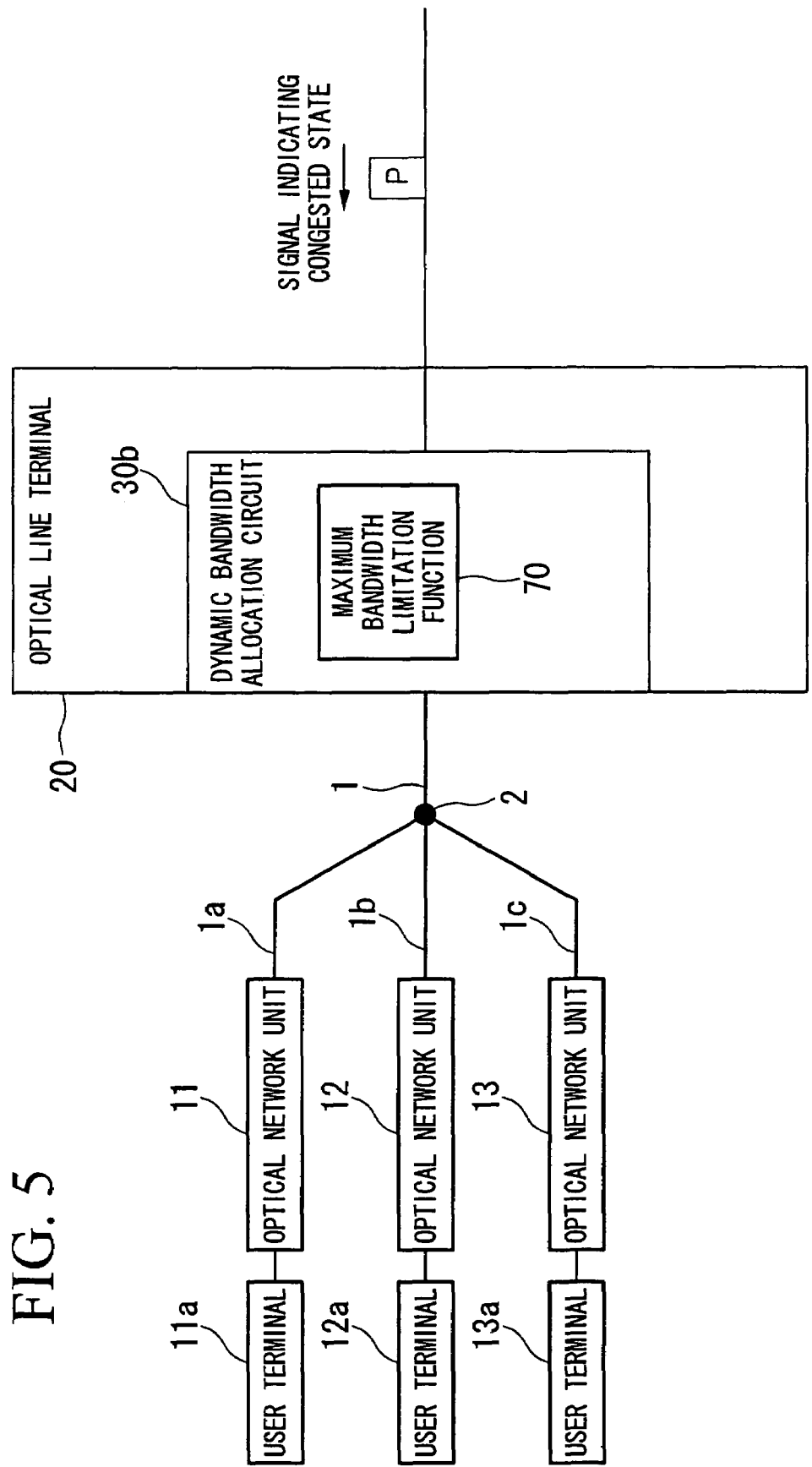
FIG. 5 is a figure showing the third preferred embodiment according to the present invention.

FIG. 5 is a figure showing the system structure of the third preferred embodiment according to the present invention. In the example shown in FIG. 5, just as with the second preferred embodiment shown in FIG. 3, a dynamic bandwidth allocation circuit 30b uses both the parameters target data size, time constant, excess allocated data size, and ideal allocated data size for maximum bandwidth, and the parameters target data size, time constant, excess allocated data size, and ideal allocated data size for guaranteed bandwidth, and performs maximum bandwidth limitation and minimum bandwidth guarantee; but, furthermore, is also made to be capable of dynamically changing over a maximum bandwidth limitation function 70 between ON and OFF.

Here, the maximum bandwidth limitation function is defined as being "a function of limiting the target data size for guaranteed bandwidth of the optical network units which exceeds the maximum limit bandwidth by target data sizes for maximum bandwidth, and of reapportioning the difference between them between the optical network units which have not yet reached maximum, in proportion to minimum guaranteed bandwidth" and "a function of determining a condition that bandwidth allocation is not granted if an ideal allocated data size for maximum bandwidth max_ideal$_{j,k}$<0 is satisfied".

Although, in this preferred embodiment, the maximum bandwidth limitation function is turned ON for all the subordinate ONUs when a signal which indicates that a congested state has been transitioned to, or a signal which indicates a congested state, is received from a host device, actually, it will be possible to temporarily stop upstream transmission of only the ONUs which are accommodating users for which the upstream load is always high.

Figure 6:
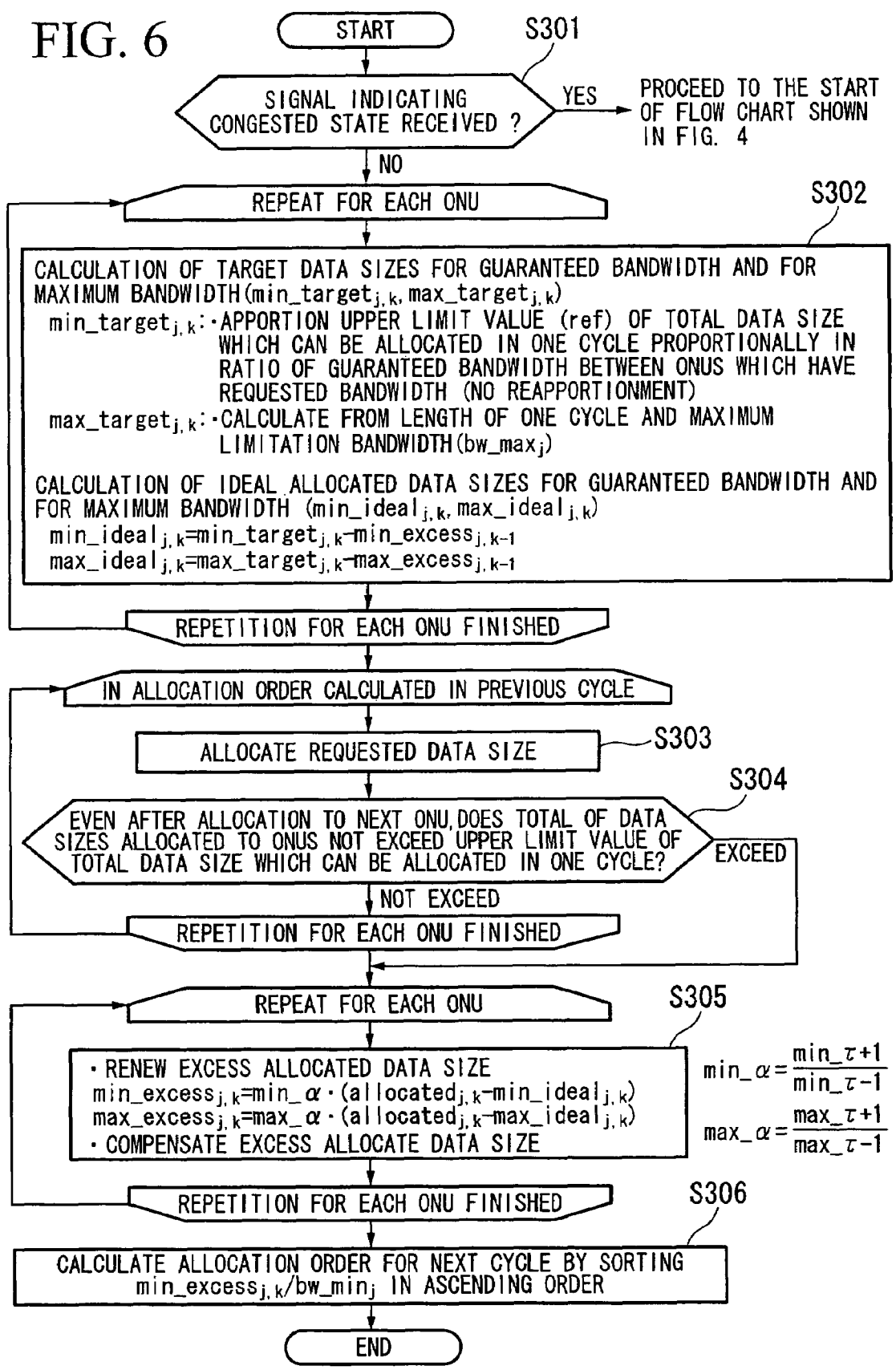
FIG. 6 is a figure showing the bandwidth allocation calculation flow in the third preferred embodiment according to the present invention.

FIG. 6 is a figure showing the bandwidth allocation calculation flow in this third preferred embodiment according to the present invention, and shows the processing flow of an algorithm for bandwidth allocation. It should be understood that, in FIG. 6, the meaning of the symbols for the various data which is used are the same as in the case of FIG. 4.

Referring to FIG. 6, first, the presence or absence of receipt of a signal which indicates the congested state checked (the step S301). If no such signal has been received, the target data size for guaranteed bandwidth is calculated by proportionally apportioning the total data size which can be allocated in one cycle between the ONUs which are demanding bandwidth in the present cycle, according to guaranteed bandwidth. Furthermore, the target data size for maximum bandwidth is also calculated in the same manner as in the second preferred embodiment. At this time, the target data size for guaranteed bandwidth is not limited, even if the target data size for guaranteed bandwidth is greater than the target data size for maximum bandwidth. After this, the ideal allocated data sizes for maximum bandwidth and for guaranteed bandwidth are calculated in the same manner as in the second preferred embodiment (in the step S302).

Next, the request data sizes are allocated in the allocation order which was calculated in the previous calculation cycle (in the steps S303 and S304). The ideal allocated data sizes for maximum bandwidth are not used. After this, the excess allocated data sizes are calculated in the same manner as in the second preferred embodiment, and the allocation order for the next cycle is determined (in the steps S305 and S306).

On the other hand, when the receipt of a signal which indicates the congested state has been detected, the allocation of bandwidth is calculated by the method shown in the second preferred embodiment. If the signal which has been received is a signal which indicates a transition to the congested state, then, after a fixed time period has elapsed, the maximum bandwidth limitation function is autonomously turned OFF.

Furthermore, methods are also contemplated of, as triggers for the maximum bandwidth limitation function, turning ON said function, if it is decided from the size of upstream traffic which the optical line terminal receives that the congested state is present, while turning it OFF, if it is decided that the congested state has been cleared up; or of setting a maximum bandwidth limitation starting time instant and ending time instant in advance for a timer which is included in the optical line terminal.

Furthermore, for an ONU which has just transmitted upstream data which exceeds the maximum bandwidth, the value of max_excess becomes great, and the value of max_ideal becomes negative. When in this state a signal which indicates the congested state is received and the maximum bandwidth limitation function is turned ON, bandwidth is not allocated until max_ideal becomes positive. In other words, this indicates that transmission of upstream data for heavy users is temporarily stopped.

Although preferred embodiments according to the present invention have been explained above, the dynamic bandwidth allocation circuit 30 and so on provided in the optical line terminals 20 shown in FIGS. 1, 3, and 5 may be one which is implemented with dedicated hardware, or may be one which consists of a memory and a CPU (a central processing unit), and in which the functions of this dynamic bandwidth allocation circuit 30 and so on are implemented by loading a program for implementing the functions of this dynamic bandwidth allocation circuit 30 and so on into the memory and executing it.

Furthermore, it would also be acceptable to constitute the dynamic bandwidth allocation circuit 30 and so on provided in the optical line terminal 20 shown in FIGS. 1, 3, and 5 with a computer system, to record a program for implementing its function upon a recording medium which can be read by the computer, and to perform the processing which is required by the dynamic bandwidth allocation circuit 30 and so on provided in the optical line terminal 20 shown in FIGS. 1, 3, and 5 by reading this program which is recorded upon this recording medium by the computer system and executing it. It should be understood that here the term "computer system" also includes an OS and hardware such as peripheral devices and the like.

Furthermore, by the term "recording medium which can be read by a computer" is meant a portable medium such as a flexible disk, an opto-magnetic disk, a ROM, a CD-ROM or the like, or a memory device housed within the computer system such as a hard disk or the like. Furthermore, the term "recording medium which can be read by a computer" also is meant to include a device which stores a program dynamically for a short time period, such as a communication line if the program is transmitted via a network such as the internet or via a communication line such as a telephone circuit (a transmission medium and a transmission wave); and in this case it also includes a device which stores the program for a fixed time, such as a volatile memory interior to a computer system which constitutes a server or a client. Yet further, the above-described program may be one for implementing a portion of the functions described previously; and, moreover, it may be a so-called differential file (differential program) which can implement the functions described previously in combination with a program which is already recorded in a computer system.

Although preferred embodiments according to the present invention have been explained above, the dynamic bandwidth allocation circuit according to the present invention is not to be considered as being limited only to the examples shown in the figures described above; as a matter of course it would be possible to supplement various changes thereto, within a range which does not depart from the gist of the present invention.

INDUSTRIAL APPLICABILITY

Since the present invention provides the beneficial effects, in a P2MP system, of reducing the consumption of memory capacity and avoiding the problem of divergence of parameters, it is possible to apply the present invention to a dynamic bandwidth allocation circuit, a dynamic bandwidth allocation method, a dynamic bandwidth allocation program, a recording medium, and the like.

The invention claimed is:

1. A dynamic bandwidth allocation circuit which is provided in a single optical line terminal of a P2MP system in which a plurality of optical network units and the single optical line terminal are connected, and which shares bandwidth in an upstream direction between the plurality of optical network units, comprising:
   a target data size calculation section which, upon each cycle and for each of the optical network units, calculates target data sizes ($target_{j,k}$) which are targets for allocated data sizes in one cycle ($allocated_{j,k}$, where j is a number of an optical network unit and k is a cycle);
   an ideal allocated data size calculation section which calculates ideal allocated data sizes ($ideal_{j,k}$) according to $ideal_{j,k}=target_{j,k}-(\alpha/(1-\alpha))\cdot excess_{j,k-1}$, where $\tau$ is an exponential weighted moving average time constant, and $\alpha=(\tau-1)/(\tau+1)$;
   an excess allocated data size calculation section which calculates excess allocated data sizes ($excess_{j,k}$) for one cycle according to $excess_{j,k}=\alpha\cdot excess_{j,k-1}+(1-\alpha)\cdot(allocated_{j,k}-target_{j,k})$; and
   a bandwidth allocation calculation section which does not grant bandwidth allocation, if the $ideal_{j,k}<0$.

2. A dynamic bandwidth allocation circuit as recited in claim 1, wherein the ideal allocated data size calculation section calculates the ideal allocated data sizes ($ideal_{j,k}$) according to $ideal_{j,k}=target_{j,k}-excess_{j,k-1}$, and the excess allocated data size calculation section calculates the excess allocated data sizes ($excess_{j,k}$) according to $excess_{j,k}=\alpha\cdot(allocated_{j,k}-ideal_{j,k})$.

3. A dynamic bandwidth allocation circuit as recited in claim 1 or claim 2, wherein the dynamic bandwidth allocation circuit comprises:
   a bandwidth request reception section which receives request data sizes corresponding to the plurality of optical network units;
   a maximum target data size calculation section which calculates maximum target data sizes corresponding to the target data sizes in proportion to maximum limit bandwidths;
   a guaranteed target data size calculation section which calculates guaranteed target data sizes in proportion to minimum guaranteed bandwidths;
   a time constant setting section which sets a time constant for maximum bandwidth and a time constant for guaranteed bandwidth as the exponential weighted moving average time constant;
   a maximum bandwidth excess allocated data size calculation section and a guaranteed bandwidth excess allocated data size calculation section which correspond to the excess allocated data size calculation section; and
   a maximum bandwidth ideal allocated data size calculation section and a guaranteed bandwidth ideal allocated data size calculation section which correspond to the ideal allocated data size calculation section, and
   wherein the bandwidth allocation calculation section: determines a condition not to grant bandwidth allocation if ideal allocated data sizes for maximum bandwidth ($max\_ideal_{j,k}$) satisfies $max\_ideal_{j,k}<0$; constructs an allocation order list by sorting numbers of the optical network units in order of smallness of values obtained by dividing the excess allocated data sizes for the guaranteed bandwidth for the respective optical network units by guaranteed bandwidths; and allocates the request data sizes from the head of the allocation order list which has been calculated in a previous cycle, for the optical network units for which bandwidth allocation has been granted by the condition, while taking a preset upper limit value for total data size which can be allocated in one cycle as an upper limit.

4. A dynamic bandwidth allocation circuit as recited in claim 3, wherein the guaranteed target data size calculation section obtains the guaranteed target data sizes by proportionally apportioning a data area which can be allocated in one cycle between the optical network units for which bandwidth requests have occurred in the present cycle, in proportion to the minimum guaranteed bandwidths;
   takes the guaranteed target data sizes of the optical network units which exceed the maximum limit bandwidths as being limited by the maximum target data sizes, and reapportions differences between the guaranteed target data sizes and the maximum target data sizes in proportion to the minimum guaranteed bandwidths between the optical network units which have not yet reached maximum; and repeats reapportionment until the guaranteed target data sizes of all of the optical network units become less than or equal to the maximum target data sizes.

5. A dynamic bandwidth allocation circuit as recited in claim 3, comprising:
   a section which sets each of the time constant for maximum bandwidth and the time constant for guaranteed bandwidth to independent and arbitrary values; and a section which sets the value of the time constant for maximum bandwidth so that it becomes greater than the value of the time constant for guaranteed bandwidth.

6. A dynamic bandwidth allocation circuit as recited in claim 5, comprising:

a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth ($max\_ideal_{j,k}$) satisfies $max\_ideal_{j,k} < 0$;

a section which turns the maximum bandwidth limitation function ON and OFF dynamically; and a section which turns the maximum bandwidth limitation function OFF for all subordinate optical network units, if no signal is received from a host network indicating a transition from no congestion being present to congestion being present;

turns the maximum bandwidth limitation function ON for all the optical network units, if a signal has been received indicating the occurrence of congestion, and again turns the maximum bandwidth limitation function OFF, after a fixed time period has elapsed.

7. A dynamic bandwidth allocation circuit as recited in claim 5, comprising:

a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth ($max\_ideal_{j,k}$) satisfies $max\_ideal_{j,k} < 0$;

a section which turns the maximum bandwidth limitation function ON and OFF dynamically; and a section which turns the maximum bandwidth limitation function OFF for all subordinate optical network units, if no signal is received from a host network indicating a congested state, or if a signal is received from the host network indicating that the congested state has been cleared up, and which turns the maximum bandwidth limitation function ON for all the optical network units, if a signal has been received indicating the congested state.

8. A dynamic bandwidth allocation circuit as recited in claim 5, comprising:

a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth ($max\_ideal_{j,k}$) satisfies $max\_ideal_{j,k} < 0$;

a section which turns the maximum bandwidth limitation function ON and OFF dynamically; and a section which turns the maximum bandwidth limitation function ON, if it has been determined that a congested state is present from a size of upstream traffic which the optical line terminal has received, and which turns the maximum bandwidth limitation function OFF, if it has been determined that the congested state has been cleared up.

9. A dynamic bandwidth allocation circuit as recited in claim 5, comprising:

a section which defines, as a maximum bandwidth limitation function, a function of, when obtaining the guaranteed target data sizes with the guaranteed target data size calculation section by proportionally apportioning a data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data sizes for maximum bandwidth ($max\_ideal_{j,k}$) satisfies $max\_ideal_{j,k} < 0$;

a section which turns the maximum bandwidth limitation function ON and OFF dynamically; and a section which sets a maximum bandwidth limitation starting time instant and a maximum bandwidth limitation ending time instant for a timer which is provided in the optical line terminal, and which turns the maximum bandwidth limitation function ON when the starting time instant arrives, and turns the maximum bandwidth limitation function OFF when the ending time instant arrives.

10. A dynamic bandwidth allocation method for a P2MP system in which a plurality of optical network units and a single optical line terminal are connected, and which shares bandwidth in an upstream direction between the plurality of optical network units, comprising:

a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle);

an ideal allocated data size calculation step which calculates ideal allocated data sizes (ideal$_{j,k}$) according to ideal$_{j,k}$=target$_{j,k}$−($\alpha$/(1−$\alpha$))·excess$_{j,k-1}$, where $\tau$ is an exponential weighted moving average time constant, and $\alpha$=($\tau$−1)/($\tau$+1);

an excess allocated data size calculation step which calculates excess allocated data sizes (excess$_{j,k}$) for one cycle according to excess$_{j,k}$=$\alpha$·excess$_{j,k-1}$+(1−$\alpha$)·(allocated$_{j,k}$−target$_{j,k}$); and a bandwidth allocation calculation step which does not grant bandwidth allocation if ideal$_{j,k}$<0.

11. A dynamic bandwidth allocation method as recited in claim 10, comprising:

a step of calculating the ideal allocated data sizes (ideal$_{j,k}$) according to ideal$_{j,k}$=target$_{j,k}$−excess$_{j,k-1}$; and a step of calculating the excess allocated data sizes (excess$_{j,k}$) according to excess$_{j,k}$=$\alpha$·(allocated$_{j,k}$−ideal$_{j,k}$).

12. A dynamic bandwidth allocation method as recited in claim 10 or claim 11, comprising:

a step of receiving request data sizes corresponding to the plurality of optical network units;

a step of calculating maximum target data sizes corresponding to the target data sizes in proportion to maximum limit bandwidths;

a step of calculating guaranteed target data sizes in proportion to minimum guaranteed bandwidths;

a step of setting a time constant for maximum bandwidth and a time constant for guaranteed bandwidth as the exponential weighted moving average time constant;

a step of calculating excess allocated data sizes for maximum bandwidth, ideal allocated data sizes for maximum bandwidth, excess allocated data sizes for guaranteed bandwidth, and ideal allocated data sizes for guaranteed bandwidth, which correspond to the excess allocated data sizes and the ideal allocated data sizes;

a step of determining a condition not to grant bandwidth allocation, if the ideal allocated data sizes for maximum bandwidth (max_ideal$_{j,k}$) satisfies max_ideal$_{j,k}$<0; and a step of constructing an allocation order list by sorting numbers of the optical network units in order of smallness of values obtained by dividing the excess allocated data sizes for the guaranteed bandwidth for the respective optical network units by guaranteed bandwidths; and allocating the request data sizes from the head of the allocation order list which has been calculated in a previous cycle, for the optical network units for which bandwidth allocation has been granted by the condition, while taking a preset upper limit value for total data size which can be allocated in one cycle as an upper limit.

13. A dynamic bandwidth allocation method as recited in claim 12, comprising a step of obtaining the guaranteed target data sizes by proportionally apportioning a data area which can be allocated in one cycle between the optical network units for which bandwidth requests have occurred in the present cycle, in proportion to the minimum guaranteed bandwidths; taking the guaranteed target data sizes of the optical network units which exceed the maximum limit bandwidths as being limited by the maximum target data sizes, and reapportioning differences between the guaranteed target data sizes and the maximum target data sizes in proportion to the minimum guaranteed bandwidths between the optical network units which have not yet reached maximum; and repeating reapportionment until the guaranteed target data sizes of all of the optical network units become less than or equal to the maximum target data sizes.

14. A dynamic bandwidth allocation method as recited in claim 12, comprising:

a step of setting each of the time constant for maximum bandwidth and the time constant for guaranteed bandwidth to independent and arbitrary values; and a step of setting the value of the time constant for maximum bandwidth so that it becomes greater than the value of the time constant for guaranteed bandwidth.

15. A dynamic bandwidth allocation method as recited in claim 14, comprising:

a step of defining, as a maximum bandwidth limitation function, a function of, when obtaining the guaranteed target data sizes by proportionally apportioning the data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth (max_ideal$_{j,k}$) satisfies max_ideal$_{j,k}$<0;

a step of turning the maximum bandwidth limitation function ON and OFF dynamically; and a step of turning the maximum bandwidth limitation function OFF for all subordinate optical network units, if no signal is received from a host network indicating a transition from no congestion being present to congestion being present; turning the maximum bandwidth limitation function ON for all the optical network units, if a signal has been received indicating the occurrence of congestion; and again turning the maximum bandwidth limitation function OFF, after a fixed time period has elapsed.

16. A dynamic bandwidth allocation method as recited in claim 14, comprising:

a step of defining, as a maximum bandwidth limitation function, a function of, when obtaining the guaranteed target data sizes by proportionally apportioning the data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth (max_ideal$_{j,k}$) satisfies max_ideal$_{j,k}$<0;

a step of turning the maximum bandwidth limitation function ON and OFF dynamically; and a step of turning the maximum bandwidth limitation function OFF for all subordinate optical network units, if no signal is received from a host network indicating a congested state, or if a signal is received from the host network indicating that the congested state has been cleared up; and of turning the maximum bandwidth limitation function ON for all the optical network units, if a signal has been received indicating the congested state.

17. A dynamic bandwidth allocation method as recited in claim 14, comprising:

a step of defining, as a maximum bandwidth limitation function, a function of, when obtaining the guaranteed target data sizes by proportionally apportioning the data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth (max_ideal$_{j,k}$) satisfies max_ideal$_{j,k}$<0;

a step of turning the maximum bandwidth limitation function ON and OFF dynamically; and a step of turning the maximum bandwidth limitation function ON, if it has been determined that a congested state is present from a size of upstream traffic which the optical line terminal has received, and of turning the maximum bandwidth limitation function OFF, if it has been determined that the congested state has been cleared up.

18. A dynamic bandwidth allocation method as recited in claim 14, comprising:

a step of defining, as a maximum bandwidth limitation function, a function of, when obtaining the guaranteed target data sizes by proportionally apportioning the data area which can be allocated in one cycle between the optical network units for which bandwidth requests have occurred in the present cycle in proportion to the minimum guaranteed bandwidths, taking the guaranteed target data sizes of the optical network units which exceed the maximum limit bandwidths as being limited by the maximum target data sizes, and reapportioning the differences between the guaranteed target data sizes and the maximum target data sizes in proportion to the minimum guaranteed bandwidths between the optical network units which have not yet reached maximum; and a function of determining a condition not to grant bandwidth allocation, if the ideal allocated data size for maximum bandwidth (max_ideal$_{j,k}$) satisfies max_ideal$_{j,k}$<0;

a step of turning the maximum bandwidth limitation function ON and OFF dynamically; and a step of setting a maximum bandwidth limitation starting time instant and a maximum bandwidth limitation ending time instant for a timer which is provided in the optical line terminal, and of turning the maximum bandwidth limitation function ON when the starting time instant arrives, and of turning the maximum bandwidth limitation function OFF when the ending time instant arrives.

19. A dynamic bandwidth allocation program embodied as a manufacture for causing a computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute:

a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle);

an ideal allocated data size calculation step which calculates ideal allocated data sizes (ideal$_{j,k}$) according to ideal$_{j,k}$=target$_{j,k}$−($\alpha$/(1−$\alpha$))·excess$_{j,k-1}$, where $\tau$ is an exponential weighted moving average time constant, and $\alpha$=($\tau$−1)/($\tau$+1);

an excess allocated data size calculation step which calculates excess allocated data sizes (excess$_{j,k}$) for one cycle according to excess$_{j,k}$=$\alpha$·excess$_{j,k-1}$+(1−$\alpha$)·(allocated$_{j,k}$−target$_{j,k}$); and a bandwidth allocation calculation step which does not grant bandwidth allocation if ideal$_{j,k}$<0.

20. A computer-readable medium encoded with computer executable instructions for causing the computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute:

a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle);

an ideal allocated data size calculation step which calculates ideal allocated data sizes(ideal$_{j,k}$) according to ideal$_{j,k}$=target$_{j,k}$−($\alpha$/(1−$\alpha$))·excess$_{j,k-1}$, where $\tau$ is an exponential weighted moving average time constant, and $\alpha$=($\tau$−1)/($\tau$+1);

an excess allocated data size calculation step which calculates excess allocated data sizes (excess$_{j,k}$) for one cycle according to excess$_{j,k}$=$\alpha$·excess$_{j,k-1}$+(1−$\alpha$)·(allocated$_{j,k}$−target$_{j,k}$); and a bandwidth allocation calculation step which does not grant bandwidth allocation if ideal$_{j,k}$<0.

21. A dynamic bandwidth allocation program embodied as a manufacture for causing a computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute:

a target data size calculation step which, upon each cycle and for each of the optical network units, calculates target data sizes (target$_{j,k}$) which are targets for allocated data sizes in one cycle (allocated$_{j,k}$, where j is a number of an optical network unit and k is a cycle);

an ideal allocated data size calculation step which calculates ideal allocated data sizes (ideal$_{j,k}$) according to ideal$_{j,k}$=target$_{j,k}$−excess$_{j,k-1}$;

an excess allocated data size calculation step which calculates excess allocated data sizes (excess$_{j,k}$) for one cycle according to excess$_{j,k}$=$\alpha$·(allocated$_{j,k}$−ideal$_{j,k}$), where $\tau$ is an exponential weighted moving average time constant, and $\alpha$=($\tau$−1)/($\tau$+1); and a bandwidth allocation calculation step which does not grant bandwidth allocation if ideal$_{j,k}$<0.

22. A computer-readable medium encoded with computer executable instructions for causing the computer provided in a dynamic bandwidth allocation circuit which is provided in a single optical line terminal of a P2MP system in which a plurality of optical network units and the single optical line terminal are connected, and which shares bandwidth in an upstream direction between the plurality of optical network units, to execute:

a target data size calculation step which, upon each cycle and for each of the optical network units, calculates target data sizes ($target_{j,k}$) which are targets for allocated data sizes in one cycle ($allocated_{j,k}$, where j is a number of an optical network unit and k is a cycle);

an ideal allocated data size calculation step which calculates ideal allocated data sizes ($ideal_{j,k}$) according to $ideal_{j,k} = target_{j,k} - excess_{j,k-1}$;

an excess allocated data size calculation step which calculates excess allocated data sizes ($excess_{j,k}$) for one cycle according to $excess_{j,k} = \alpha \cdot (allocated_{j,k} - ideal_{j,k})$, where $\tau$ is an exponential weighted moving average time constant, and $\alpha = (\tau-1)/(\tau+1)$; and a bandwidth allocation calculation step which does not grant bandwidth allocation if $ideal_{j,k} < 0$.

* * * * *